(12) United States Patent
Kikuchi

(10) Patent No.: US 7,618,665 B2
(45) Date of Patent: Nov. 17, 2009

(54) PROCESS FOR PREPARING UKON FOR FOOD

(76) Inventor: Bin Kikuchi, 7-8 4-chome 10-Jo Shinoro, Kita-ku, Sapporo City, Hokkaido (JP)

( * ) Notice: Subject to any disclaimer, the term of this patent is extended or adjusted under 35 U.S.C. 154(b) by 614 days.

(21) Appl. No.: 11/016,773

(22) Filed: Dec. 21, 2004

(65) Prior Publication Data

US 2005/0106307 A1    May 19, 2005

(51) Int. Cl.
*A23B 7/10*    (2006.01)
*A23L 1/221*   (2006.01)

(52) U.S. Cl. .................. 426/49; 426/521; 426/650

(58) Field of Classification Search .................. 426/49, 426/52, 520, 521, 638, 650, 661
See application file for complete search history.

(56) References Cited

U.S. PATENT DOCUMENTS

| | | | |
|---|---|---|---|
| 3,937,843 A | 2/1976 | Osaka et al. | |
| 3,950,543 A | 4/1976 | Buffa et al. | |
| 3,958,015 A | 5/1976 | Gay | |
| 3,974,294 A | 8/1976 | Schwille et al. | |
| 3,979,522 A | 9/1976 | Scott | |
| 4,008,334 A | 2/1977 | Hansen | |
| 4,115,591 A | 9/1978 | Noda et al. | |
| 4,216,235 A | 8/1980 | Dasek et al. | |
| 4,642,236 A | 2/1987 | Friend et al. | |
| 4,649,052 A | 3/1987 | Sumi et al. | |
| 5,690,984 A | 11/1997 | Lim | |

FOREIGN PATENT DOCUMENTS

| | | |
|---|---|---|
| JP | 8214825 | 8/1996 |
| JP | 112085 | 4/1998 |

OTHER PUBLICATIONS

Yook et al., Korean J. Food Sci. & Tech., 28(6): 1119-11125, 1996.
A. Lloyd, J. Food Technol., 10(4): 407-413, 1975.

*Primary Examiner*—Leslie Wong
(74) *Attorney, Agent, or Firm*—Clyde I. Coughenour

(57) ABSTRACT

A ginger plant containing curcumin, such as Ukon or turmeric, is enhanced for use as a food by fermenting it with a starch and red koji mold. Each 100 weight of Ukon has mixed with it 1.0 to 20.0 weight of starch and 0.1 to 10.0 weight of red koji mold. In addition, saccharides of 0.1 to 10.0 weight and minerals of 0.1 to 1.0 weight can be added to the mix. The fermentation process can be regulated by the addition of a mold of the *Monascus* genus. The water content is adjusted to 50 to 75 weight percent using water at 80° C. to 90° C. followed by sterilization at 110° C. to 130° C. for ½ to 1½ hours at atmospheric pressure. The one or more molds of the *Monascus* genus are added followed by fermentation at 25 to 40° C. for 5 to 1000 hours. The fermented mixture is force air dried using air at 40° C. to 50° C. for 5 to 9 hours.

14 Claims, No Drawings

PROCESS FOR PREPARING UKON FOR FOOD

BACKGROUND OF THE INVENTION

1. Field of the Invention

The bitterness of Ukon or turmeric derivatives are removed by fermenting it with red koji mold and a starch to break down the bitter water-insoluble essential oil components and other macromolecular substances into water soluble lower molecular weight substances, while adjusting its beneficial effect on liver functions, increasing antioxidant characteristics, etc., and while retaining curcumin. The known process is modified to simplify and improve the steps of the process.

2. Description of Related Art

Ukon or turmeric is a plant of the ginger family, that includes curcumin, cultivated in places such as India, South East Asia, China and Okinawa. In recent years, accompanying the sophistication of the diet and foods consumed, is an increase in the active oxygen generated in our bodies. The result has been an increase in the formation of oxidant lipids and the like. It has been observed that patients with metabolic disorders, arteriosclerosis and the like are increasing. Accordingly, there is a pressing need to provide methods for preventing these disorders.

Ukon or turmeric has been used as the principal ingredient of curry powder. It has been the focus in recent years as a natural plant material that has efficacy in improving liver and other body functions. Ukon is a hardy or long-lived plant which is cultivated mainly in the tropical to semitropical regions of India, Southeast Asia, China, Okinawa and the like. Ukon includes components of curcumin, and essential oils. It has been used as a type of eastern medicine for a long time as a remedy for hepatitis, nephritis, cholangitis, cholecystolithiasis, gastritis and the like. However, Ukon has a characteristic bitter taste and the problem is that it is difficult to eat it as it is and to use it over a long period of time.

In Japanese Laid Open patent publication 8-214825, a manufacturing method for Ukon foodstuff discloses that residue from refined grains and saccharides can be added to Ukon, after which lactic acid bacteria or lactic acid bacteria and yeast are added as a culture medium that causes fermentation. Specifically, the root stalk of Ukon is dried, and residue from refined grains of rice bran, wheat bran, and the like are added to it along with saccharides; lactic acid bacteria of Streptococcus, Samofirus, and Lactobacillus, or lactic acid bacteria and yeast as a culture medium for fermenting the Ukon. After fermentation, it is heat dried. There are problems in this production method. There is insufficient removal of the bitter component characteristic of Ukon, the amount of curcumin, which is presumed to have an improved effect on the liver function, is reduced, and the lactic acid bacteria used for fermenting the Ukon is easily polluted by other bacteria, that kills or easily destroys it. Because of this, the fermentation process needs to be performed in a short period of time. Also, the fermentation process using lactic acid bacteria results in a Ukon foodstuff which does not have a good anti-oxidant characteristic, it does not control active oxygen.

Japanese Patent Application No. 112085 filed Apr. 22, 1998 for "Manufacturing Method of Ukon Foodstuff" applicant Tetsuo Itokazu and inventor Yoshihito Sadoyama, incorporated herein by reference, discloses a process of fermenting Ukon to remove its bitter components by reducing their molecular weights. The Ukon is prepared by cleaning and heat treating it until its moisture content is reduced to 10% by weight. It is then ground until it has a particle size of from 2-4 mm. The Ukon is then mixed with a mineral, that can be Magnesium Sulfate or Potassium Nitrate; a starch that can be polished rice, whole grained rice, wheat, millet, kaoliang, buckwheat, corn, soybean, azuki bean, or their sugars, bran or germ; a saccharide, that can be glucose, fructose, sucrose, or galactose. The by weight mix per 100 weight of Ukon is starch 1-20 weight, red yeast 0.5-10 weight, saccharides 0.1-10 weight, minerals 0.1-1.0 weight with water added at 60° C. until it makes up 50-75% of the mix weight.

The mix is then sterilized in a pressure cooker at 60-120° C. from 0.1-100 hrs. at 1.1 atmospheres.

The mix is then cooled and a red yeast, that can be *Monascus anka*, is added and if not previously regulated, it is injected with a second mold of the *Monascus* genus, that can be *Monascus anka, Monascus pilosus, Monascus ruber*, etc., and fermented at 25-40° C. for 5-100 hours.

After fermentation it is heat dried at 60-100° C. for 0.1-100 hours and the moisture content reduced to about 3%. The bitter components are shown to be reduced by smell, taste, curcumin content and DPPH tests.

SUMMARY OF THE INVENTION

By fermenting plants such as Ukon or turmeric with the addition of varieties of starch and red koji mold, and with the further addition of saccharides, minerals and the like, the amount of curcumin retained is increased; the components causing the bitter taste are removed; the beneficial effects on the liver are retained; and beneficial anti-oxidant characteristics are added.

The fermentation process breaks down the bitter essential oil components and macromolecular molecules into smaller water-soluble molecules. The red koji mold has an anti-oxidant effect and provides an excellent control over active oxygen. The red koji mold used as the fermentation culture medium has a high rate of survival. This reduces the need for close production supervision as the fermentation can be performed over a long period of time. The fermentation is regulated by mold of the monascus genus, giving a superior fermentation efficiency and control of active oxygen. The red koji mold allows the use of higher fermentation temperatures. The addition of saccharides and minerals assists the fermentation process and also helps to reduce the amount of curcumin lost. The enzyme amylase protease and the like break up the large molecules. The Ukon foodstuff can be used as a tea and can be added to bread, candy, crackers and the like giving added health benefits to these foods. The process can be simplified and improved by temperature variations and elimination of pressure steps and equipment. Your applicant has discovered that by raising the temperature of the water added in the pre-sterilization step the sterilization process is simplified. The fermentation temperature can be reduced and the post-sterilization process can be conducted at lower drying temperature using forced air with an increased retention of the beneficial components of the turmeric while decreasing the bitterness and lowering the drying time required.

DESCRIPTION OF THE PREFERRED EMBODIMENTS

The basic materials or ingredients used in the present process include a member of the ginger family, starch and a red koji mold. A mineral and a saccharide can be added to the basic mix. The primary ginger plant of interest is the Ukon or turmeric plant. The Ukon used is not limited to any particular species as long as it is a plant of the ginger family that includes curcumin.

While the starch used is not limited to a specific variety it is preferred that the starch from at least one of the groups consisting of polished rice, whole-grained rice, wheat, millet, kaoliang, buckwheat, corn, soybean, azuki bean or their derivatives, i.e sugars, bran or germ. The starch variety generates saccharides by hydrolysis with red koji mold and activates or continues the fermentation of Ukon for a long time.

To 100 weight units of Ukon, starch within the range of 1.0 to 20.0 weight units and red koji mold within the range of 0.1 to 10.0 weight units are mixed and fermented. If the amount of starch added is within this range, the starch will not break up with the addition of water and there is little concern that it will remain behind after fermentation. The fermentation of the Ukon performed by the red koji mold can be extended over a long period of time.

The red koji mold needed for fermentation is not limited to any particular form. The red mold used can be dried, pulverized and used in a powder form. It is also possible to mix the red koji mold with high molecular materials, liquid particles and the like, and use it in the configuration of an excipient as an alternative vehicle or mass. It is preferred that the red koji mold fermentation process be regulated by the same or another mold of the *Monascus* genus. More specific types of mold that can be used include *Monascus anka, Monascus pilosus, Monascus ruber* and the like. These molds can be independently used for regulating the red koji mold to get specific end products independently or two or more mold types can be mixed together for regulating the red koji mold to get specific end products.

The red koji mold used can be manufactured and regulated by ordinary manufacturing processes. These methods can include the solid leaven methods (scattering or pounding) or liquid leaven methods. The red koji mold can be obtained by cultivation in a favorable environment for 2 to 14 days. It is preferred that a liquid culture medium with an injection extract of rice bran or the like be the principal component.

It is generally accepted that the different types of red koji mold have different medicinal values such as reducing blood pressure, breaking up body poisons, breaking down alcohol, improving liver function, etc. The end product of the Ukon fermentation process can be adjusted by addition of one or more of these molds of the *Monascus* strain. The adjustment allows for manufacture of products that address specific concerns or problems.

By regulating the fermentation of red koji mold to have a predominant amount of *Monascus anka* it is generally accepted that there is an improvement in liver function, digestion, and blood circulation, a predominant amount of *Monascus ruba* works as an antioxidant, improves liver function, stabilizes blood pressure and reduces cholesterol, a dominant amount of *Monascus pilosus* works as an antioxidant, stabilizes blood pressure, and reduces cholesterol.

The saccharides that can be used in the present invention are not particularly restricted as long as they are monosaccharides and polysaccharides. Examples that can be used are glucose, fructose, sucrose, galactose, and the like. As an alternative saccharide containing materials such as molasses or honey can be used.

Saccharides can be added to the mix. To 100 weight units of Ukon, 0.1 to 10.0 weight units of saccharides can be added to the Ukon before it is fermented. The addition of saccharides assists fermentation. In this range the saccharides are all used up during fermentation.

The minerals that can be used include Magnesium Sulfate ($MgSO_4$-$7H_2O$), Potassium Nitrate ($KNO_3$), Magnesium Chloride ($MgCl_2$) and the like.

Minerals can be added to the mixture. To each 100 weight units of Ukon, 0.1 to 1.0 weight units of minerals can be added. The minerals assist in maintaining the activity of the koji mold.

It has been found desirable on occasion to ferment the turmeric by adding yeast, various kinds of nitrogen compounds (including proteins), carbon sources (including lipids), inorganic material, and vitamins other than those listed. The taste can also be improved by adding tangle weed powder rich in minerals.

For fermentation, the first step has been to prepare the plant, such as Ukon. The Ukon root stem has been washed with water and sectioned into small pieces. The small pieces of turmeric root have been thermally dried using a hot air flow so that they can be easily pulverized. After the water content is brought down to about 10 weight percent, they were placed in a pulverizer. After pulverization, the Ukon has been divided into particulate form having a particle size of from 2 to 4 mm average diameter.

Your applicant has discovered that by the addition of water with a temperature of 80 to 90° C. the use of thermal drying during the Ukon preparation is not necessary and particles up to 1 cm can be used. The average particle size preferred can be from 100 mesh to 10 mm and still retain a more even fermentation. In this form, there is a more efficient removal of the bitter components of the Ukon.

The second step is to mix the ingredients. A blender is used to mix the Ukon, starch, mineral and saccharide into an even consistency. It is preferred that the moisture content of the mixture be controlled during the fermentation process. The water should make up from 50 to 75 weight percent of the mixture. By controlling the amount of water included in the mixture, the efficiency of the fermentation process is increased. The ideal amount of water is within the range of 60 to 70 weight percent. Water, heated to about 60° C., has been added to the mixture until it makes up about 60 to 70% of the total mixture.

The next step in the past has been to sterilize the mixture. after adding water warmed to 60° C. and adjusting the moisture ratio, by using a pressure pan such as an autoclave. This has, for example, been done at 120° C. for one hour under 1.1 atmospheres of pressure. It is preferred that the mixture be placed in a gazette bag during steriliation. Sterilization of the Ukon can be carried out by steam or by water or hot air at 110 to 120° C. before or after the Ukon is mixed with the other components, but before the red koji mold is added. The mix is then fermented with mold growth during slow fermentation. The mold growth is stopped by drying the fermented mix.

It has been discovered by your applicant that, after the mixing step, by adding water at a temperature of from 80 to 90° C., to raise the moisture content of the mix to 60 to 70 weight percent, the sterilization or pasteurization process can be carried out at atmospheric pressure.

The thermal sterilization can be done without the use of an autoclave. Sterilizing is performed at from 115° C. to 125° C. under atmospheric pressure for from ½ hour to 1½ hours.

After sterilization the mixture is cooled to room temperature. The mixture is then injected or inoculated with a prescribed amount of red koji mold as the culture medium. The mixture can have a second injection with the same or another mold of the *Monascus* genus such as *Monascus anka, Monascus pilosus, Monascus ruber* and the like. The second injection can be used to modify or control the end product.

The initial inoculation of red koji mold can be as low as 2% of the initial Ukon weight. The second inoculation or injection can be from 2 to 5% of the initial Ukon weight depending on the fermentation time and the advantages the end product is to have.

The fermentation conditions using the red koji mold can be varied within limits. The fermentation process can occur at from 25-45° C. for from 5 to 1,000 hours. Under these fermentation conditions, the bitter components of the Ukon are removed with little concern necessary for destruction of the red koji mold.

As an example, the Ukon fermented product was obtained by fermenting for 30 days in the culture or gazette bag at a temperature of from 15 to 30° C. with a 60 weight percent water present in the fermentation medium.

Upon completing the fermentation process, it has been found advantageous to treat the fermented mixture. The heat treatment more efficiently maintains the improved effect of the Ukon on the liver functions. The heat treatment of the mixture can be conducted at a temperature of from 60 to 100° C. for from 0.1 to 100 hours by air circulation. The resulting fermented Ukon product is dried at 70 to 80° C. for about 8 hours until the amount of water drops to about 3%. This is used as the raw material for food. After the turmeric rhizome is thermally dried with hot air, it can be ground to a particle size.

It has been discovered by your applicant that the post fermentation heating drying process can be conducted at a temperature of from 40 to 50° C. for from 5 to 9 hours using forced air circulation. The lowering of the drying temperature by using forced air results in an increased retention of the beneficial components of the turmeric while decreasing the components causing the bitter taste. An additional benefit is a reduction in the drying time. The improved beneficial liver function is retained while ingredients causing the bitter taste having the lower molecular weights due to the fermentation, can be removed. These bitter components of the turmeric are generally understood to be azulene, turmerone, and cineole. They are the ingredients eliminated or reduced by lowering of their molecular weight during fermentation. The beneficial components curcumol, curcumin, tumeric and alfa-curcumin are retained.

EXAMPLE 1

As an example of the improved process, Ukon root stems were washed in water, sliced and processed. The root stem was then dried using hot air. The dried root stem was then pulverized into particles having an average diameter of about 10 mm. The pulverized Ukon was then mixed with 5.0 g of rice bran, 0.5 g of magnesium sulfate ($MgSO_4$) and 5.0 g of glucose for each 100 g of Ukon. Water heated to 90° C. was added to the mixture until the water made up 60% of the total weight of the mixture. The mixture was placed in a gazette culture bag and sterilized at 120° C. for 1 hour under atmospheric pressure. The mixture was then cooled to room temperature. A red koji mold, *Monascus anka*, was prepared in a liquid culture medium using rice bran injection extract as the principal component. A first injection of 2 g was injected into the mixture. A second injection of 4 g of the red koji mold, *monascus ruba*, was injected into the mixture. The mixture was then fermented in the culture bag for 30 days at a temperature of 25 to 30° C. After fermentation, the mixture was force air heat dried at 45° C. for 8 hours until the water content dropped to about 3% forming the raw material. The raw material characteristics were comparable to or better than those in the patent application JP 112085, filed 22 Apr. 1998.

EXAMPLE 2

The same process was used as in Example 1 except that *Monascus pilosus* rather than *Monascus ruber* was used in a 1 to 1 ration weight as the mold.

EXAMPLE 3

The same process was used as in Example 1 except that *Monascus ruber* and *Monascus pilosus* in a 1 to 1 weight ratio was used.

EXAMPLE 4

The same process was used as in Example 1 except that *Monascus anka* alone was used.

EXAMPLE 5

The same process was used as in Example 1 except that *Monascus pilosus* alone was used.

EXAMPLE 6

The same process was used as in Example 1 except that *Monascus ruber* alone was used.

The resulting product for Examples 2-6 had characteristics comparable to or better than those in the patent application, JP 112085, filed 22 Apr. 1998.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

The invention claimed is:

1. A process for preparing a member of the ginger family containing curcumin for use as a food comprising:
   preparing an amount of said ginger family member;
   adding an amount of starch to said ginger family member to form a first mixture;
   adding heated water at a temperature of from 80° C. to 90° C. to said first mixture;
   sterilizing said first mixture to form a sterilized mixture;
   conducting said sterilizing of said first mixture at 110° C. to 125° C. under atmospheric pressure;
   adding a first red koji mold to said sterilized mixture to form a second mixture;
   fermenting said second mixture to form a fermented mixture;
   drying said fermented mixture.

2. A process for preparing a member of the ginger family containing curcumin for use as a food as in claim 1 including:
   continuing adding said heated water to said first mixture until water makes up from 60 to 70% of said first mixture.

3. A process for preparing a member of the ginger family containing curcumin for use as a food as in claim 1 wherein:
   selecting said first red koji mold from *Monascus anka*, *Monascus pilosus*, and *Monascus ruber*.

4. A process for preparing a member of the ginger family containing curcumin for use as a food as in claim 3 including:

adding a second different red koji mold to said second mixture prior to fermenting said second mixture;

selecting said second different red koji mold from *Monascus anka, Monascus pilosus*, and *Monascus ruber.*

5. A process for preparing a member of the ginger family containing curcumin for use as a food as in claim 4 including:

adding said first red koji mold in an amount from 2 to 5 percent of the ginger family member weight;

adding said second red koji mold to said second mixture prior to fermentation;

adding said second red koji mold in an amount that is 2 to 5 percent of the ginger family member weight.

6. A process for preparing a member of the ginger family containing curcumin for use as a food as in claim 1 including:

drying said fermented mixture by using forced air circulation through it with air at from 40° C. to 50° C.

7. A process for preparing a member of the ginger family containing curcumin for use as a food as in claim 6 including:

selecting said starch from the group consisting of rice, wheat, millet, kaoliang, buckwheat, corn, soybean and azuki bean;

adding a saccharide to said first mixture prior to fermentation;

selecting said saccharide from the group consisting of glucose, fructose, sucrose and galactose;

adding a mineral to said first mixture prior to fermentation;

selecting said mineral from the group consisting of Magnesium Sulfate, Potassium Nitrate, and Magnesium Chloride.

8. A process for preparing a member of the ginger family containing curcumin for use as a food as in claim 7 including:

adding said starch in the amount of 1.0 to 20.0 weight units to each 100 weight unit of said ginger family member;

adding said saccharide in the amount of 0.1 to 10.0 weight units to each 100 weight unit of said ginger family member;

adding said mineral in the amount of 0.1 to 1.0 weight unit to each 100 weight unit of said ginger family member.

9. A process for preparing a member of the ginger family containing curcumin for use as a food as in claim 6 including:

selecting said starch from the group consisting of rice, wheat, millet, kaoliang, buckwheat, corn, soybean and azuki bean;

adding a saccharide to said first mixture prior to fermentation;

selecting said saccharide from the group consisting of glucose, fructose, sucrose and galactose;

adding a mineral to said first mixture prior to fermentation;

selecting said mineral from the group consisting of Magnesium Sulfate, Potassium Nitrate, and Magnesium Chloride;

adding said starch in the amount of 1.0 to 20.0 weight unit to each 100 weight unit of said ginger family member;

adding said saccharide in the amount of 0.1 to 10.0 weight unit to each 100 weight unit of said ginger family member;

adding said mineral in the amount of 0.1 to 1.0 weight unit to each 100 weight unit of said ginger family member.

10. A process for preparing a member of the ginger family containing curcumin for use as a food as in claim 9 including:

adding said first red koji mold in an amount of from 2 to 5 percent of the ginger family member weight to said sterilized mixture;

adding a second different red koji mold to said sterilized mixture prior to fermentation;

adding said second red koji mold in an amount that is 2 to 5 percent of the ginger family member weight.

11. A process for preparing a member of the ginger family containing curcumin for use as a food as in claim 1 wherein:

said fermenting is carried out at 25° C. to 45° C. for from 5 to 1,000 hours.

12. A process for preparing a member of the ginger family containing curcumin for use as a food as in claim 1 wherein:

said preparing of said ginger family member is done by dividing said ginger family member into pieces ranging between 100 mesh to 10 mm.

13. A process for preparing a member of the ginger family containing curcumin for use as a food as in claim 6 including:

continuing said forced air circulation for from 5 to 9 hours until said water content is reduced to 3%.

14. A process for preparing a member of the ginger family containing curcumin for use as a food as in claim 1 including:

continuing said sterilizing for from ½ to 1½ hours.

* * * * *